US011199893B2

(12) United States Patent
Cheng et al.

(10) Patent No.: US 11,199,893 B2
(45) Date of Patent: Dec. 14, 2021

(54) METHOD, DEVICE FOR PROCESSING DATA OF BLUETOOTH SPEAKER, AND BLUETOOTH SPEAKER

(71) Applicant: SHENZHEN GRANDSUN ELECTRONIC CO., LTD., Shenzhen (CN)

(72) Inventors: Wen Cheng, Shenzhen (CN); Haiquan Wu, Shenzhen (CN); Dayong Tang, Shenzhen (CN); Enqin Zhang, Shenzhen (CN); Lei Cao, Shenzhen (CN); Ruiwen Shi, Shenzhen (CN)

(73) Assignee: SHENZHEN GRANDSUN ELECTRONIC CO., LTD., Shenzhen (CN)

( * ) Notice: Subject to any disclaimer, the term of this patent is extended or adjusted under 35 U.S.C. 154(b) by 293 days.

(21) Appl. No.: 16/369,185

(22) Filed: Mar. 29, 2019

(65) Prior Publication Data
US 2019/0302866 A1    Oct. 3, 2019

(30) Foreign Application Priority Data

Mar. 30, 2018 (CN) .......................... 201810277231.5

(51) Int. Cl.
*G06F 1/32* (2019.01)
*G06F 1/3209* (2019.01)
(Continued)

(52) U.S. Cl.
CPC .......... *G06F 1/3209* (2013.01); *G06F 1/3287* (2013.01); *G06F 3/167* (2013.01);
(Continued)

(58) Field of Classification Search
CPC ..... G06F 1/32; G06F 1/26; G06F 1/12; G06F 9/44; H04W 8/00
See application file for complete search history.

(56) References Cited

U.S. PATENT DOCUMENTS 9,633,661 B1    4/2017  Typrin et al.
2003/0048885 A1 *  3/2003  Adamczyk ........ H04M 3/53333
                                                          379/88.22
(Continued)

FOREIGN PATENT DOCUMENTS

CN    103067793 A    4/2013
CN    104580755 A    4/2015
(Continued)

OTHER PUBLICATIONS

Search Report dated Jun. 5, 2019 in corresponding European Application No. 19166157.8; 7 pages.

*Primary Examiner* — Keshab R Pandey
(74) *Attorney, Agent, or Firm* — Maier & Maier, PLLC

(57) ABSTRACT

The method for processing data of Bluetooth speaker includes: running a first program firmware before the Bluetooth speaker is awakened; awakening the Bluetooth speaker after detecting wake-up information by the first program firmware, and caching received speech data by the first program firmware; establishing connection with a terminal device, and transmitting the speech data to the terminal device; and switching from the first program firmware to the second program firmware for operation if a request for re-establishing connection from the terminal device is received after current connection with the terminal device is disconnected, and receiving speech data fed back by the terminal device through the second program firmware, and playing the speech data fed back by the terminal device. The present application can increase the space for storing speech data when the size of the storage space of a system is fixed, thereby caching more speech data.

20 Claims, 4 Drawing Sheets

(51) Int. Cl.
*H04W 4/80* (2018.01)
*G06F 1/3287* (2019.01)
*G10L 21/0208* (2013.01)
*H04R 3/04* (2006.01)
*H04W 52/02* (2009.01)
*G06F 3/16* (2006.01)
*G10L 15/22* (2006.01)

(52) U.S. Cl.
CPC ............ *G10L 21/0208* (2013.01); *H04R 3/04* (2013.01); *H04W 4/80* (2018.02); *H04W 52/0229* (2013.01); *H04W 52/0274* (2013.01); *G10L 15/22* (2013.01); *G10L 2021/02082* (2013.01); *H04R 2420/07* (2013.01)

(56) References Cited

U.S. PATENT DOCUMENTS

| | | | | |
|---|---|---|---|---|
| 2006/0234632 | A1* | 10/2006 | Lin | H04W 8/245 455/41.2 |
| 2011/0111735 | A1* | 5/2011 | Pietrow | H04M 1/642 455/414.1 |
| 2011/0145363 | A1* | 6/2011 | Ananthanarayanan | G06F 16/172 709/218 |
| 2015/0160881 | A1* | 6/2015 | Lewis | G06F 9/441 711/103 |
| 2016/0378455 | A1* | 12/2016 | Lochan | H04L 67/34 717/169 |
| 2017/0154519 | A1 | 6/2017 | Liu et al. | |
| 2017/0206897 | A1* | 7/2017 | Jiang | G10L 13/08 |
| 2018/0091962 | A1* | 3/2018 | Hernandez | H04W 4/02 |
| 2018/0218367 | A1* | 8/2018 | Mendoza | G06Q 20/322 |
| 2020/0249934 | A1* | 8/2020 | Escofet Via | G06F 8/654 |

FOREIGN PATENT DOCUMENTS

| | | |
|---|---|---|
| CN | 105376144 A | 3/2016 |
| CN | 107241689 A | 10/2017 |
| CN | 107256707 A | 10/2017 |
| CN | 107404340 A | 11/2017 |
| CN | 107797945 A | 3/2018 |
| CN | 107808670 A | 3/2018 |

* cited by examiner

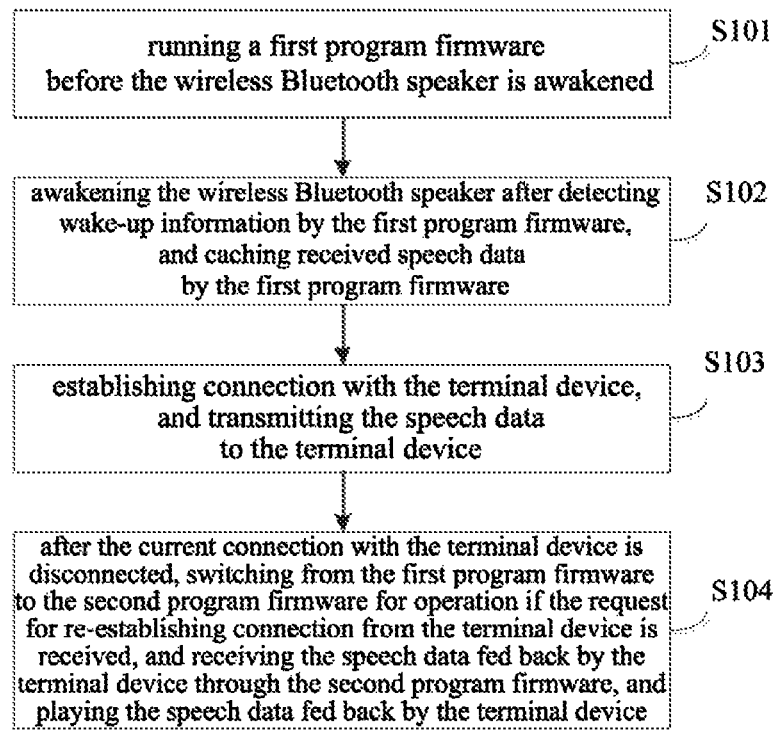
FIG. 1-a
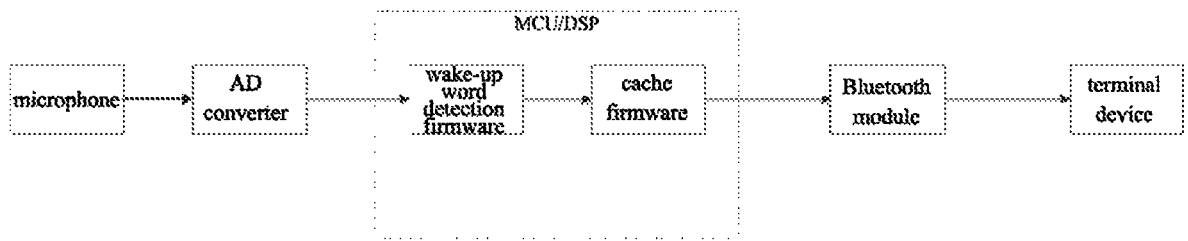
FIG. 1-b
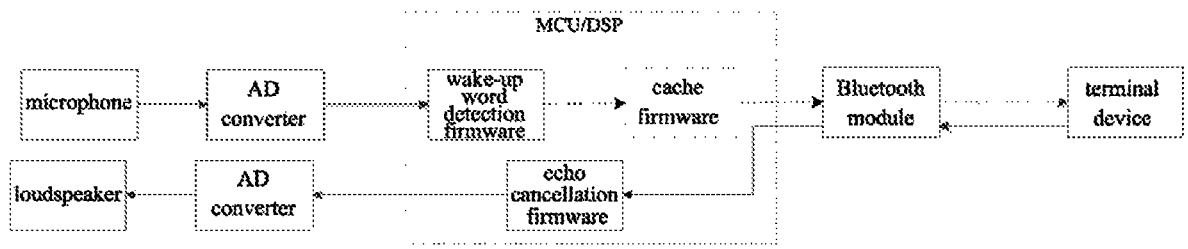
FIG. 1-c

METHOD, DEVICE FOR PROCESSING DATA OF BLUETOOTH SPEAKER, AND BLUETOOTH SPEAKER

TECHNICAL FIELD

The present application relates to the technical field of wireless Bluetooth speakers, and in particular to a method and a processor device for processing data of wireless Bluetooth speaker, and a wireless Bluetooth speaker and a computer readable storage medium.

BACKGROUND

With the development of speech recognition technologies, intelligent speaker devices with speech wake-up function have been rapidly developed. Due to their small size, low power consumption and portability, the intelligent wireless Bluetooth speakers have been widely used in real life.

In the prior art, in order to prevent the loss of speech data during the process of establishing connection with a terminal device, the intelligent wireless Bluetooth speakers will often cache the speech data while receiving the speech data, and then the size of the space used to store the speech data is relatively determined when the memory space of the system is fixed, which is extremely disadvantageous for caching a large amount of speech data, thereby bringing users a poor experience.

SUMMARY

Given this, the present application provides a method and a processor device for processing data of a wireless Bluetooth speaker, and a wireless Bluetooth speaker, which can increase the space for storing speech data when the size of the storage space of a system is fixed, thereby caching more speech data.

A first aspect of the embodiments of the present application provides a method for processing data of a wireless Bluetooth speaker, the wireless Bluetooth speaker includes a first program firmware and a second program firmware, and the method includes:

running the first program firmware before the wireless Bluetooth speaker is awakened;

awakening the wireless Bluetooth speaker after detecting wake-up information by the first program firmware, and caching received speech data by the first program firmware;

establishing connection with the terminal device, and transmitting the speech data to the terminal device; and switching from the first program firmware to the second program firmware for operation if the request for re-establishing connection from the terminal device is received after the current connection with the terminal device is disconnected, and receiving the speech data fed back by the terminal device through the second program firmware, and playing the speech data fed back by the terminal device, where, the speech data fed back by the terminal device is response data corresponding to the speech data transmitted by the wireless Bluetooth speaker to the terminal device.

A second aspect of the embodiments of the present application provides a processor device for processing data of a wireless Bluetooth speaker, the wireless Bluetooth speaker includes a first program firmware and a second program firmware, and the processor device includes:

a first processor, configured to run the first program firmware before the wireless Bluetooth speaker is awakened;

a speech wake-up module, configured to awaken the wireless Bluetooth speaker after detecting wake-up information by the first program firmware, and to cache received speech data by the first program firmware;

a communication module, configured to establish connection with the terminal device, and to transmit the speech data to the terminal device; and a second processor, configured to switch from the first program firmware to the second program firmware for operation if the request for re-establishing connection from the terminal device is received after the current connection with the terminal device is disconnected, and to receive the speech data fed back by the terminal device through the second program firmware, and to play the speech data fed back by the terminal device, where, the speech data fed back by the terminal device is response data corresponding to the speech data transmitted by the wireless Bluetooth speaker to the terminal device.

A third aspect of the embodiments of the present application provides a wireless Bluetooth speaker, which includes: a memory, a processor, and computer program stored in the memory and executable by the processor. The processor, when executing the computer program, implements the method mentioned in the first aspect.

A fourth aspect of the embodiments of the present application provides a computer readable storage medium, which includes: computer program stored in the computer readable storage medium, the computer program, when executed by a processor, implements the method mentioned in the first aspect.

Compared with the prior art, the embodiments of the present application have the beneficial effect that: in the embodiments, the first program firmware is run before the wireless Bluetooth speaker is awakened. After detecting the wake-up information by the first program firmware, the wireless Bluetooth speaker is awakened, and the received speech data is cached through the first program firmware. Then, the connection with the terminal device is established, and the speech data is transmitted to the terminal device. After the current connection with the terminal device is disconnected, the first program firmware is switched to the second program firmware for operation if the request for re-establishing connection from the terminal device is connected, and the speech data fed back by the terminal device is received through the second program firmware, and then the speech data fed back by the terminal device is played. According to the embodiments of the present application, when the size of the storage space of the system is fixed, the running program firmware can be flexibly adjusted according to the state of the wireless Bluetooth speaker, thereby increasing the size of the storage space of the system for storing speech data, and achieving the purpose of caching more speech data, which has relatively strong easy to use and practicability.

DESCRIPTION OF THE DRAWINGS

In order to more clearly illustrate the technical solutions in the embodiments of the present application, the drawings used in the description of the embodiments or the prior art will be briefly described below. It is obvious that the drawings in the following description are only some embodiments of the present application, and other drawings may be obtained according to these drawings for those of ordinary skill in the art without any creative work.

FIG. 1-*a* is a schematic flowchart of the method for processing data of a wireless Bluetooth speaker provided by the first embodiment of the present application.

FIG. 1-*b* is a schematic diagram of a forward link including a first program firmware provided by the first embodiment of the present application.

FIG. 1-*c* is a schematic diagram of a reverse link including a second program firmware provided by the first embodiment of the present application.

DETAILED DESCRIPTION

Figure 2:
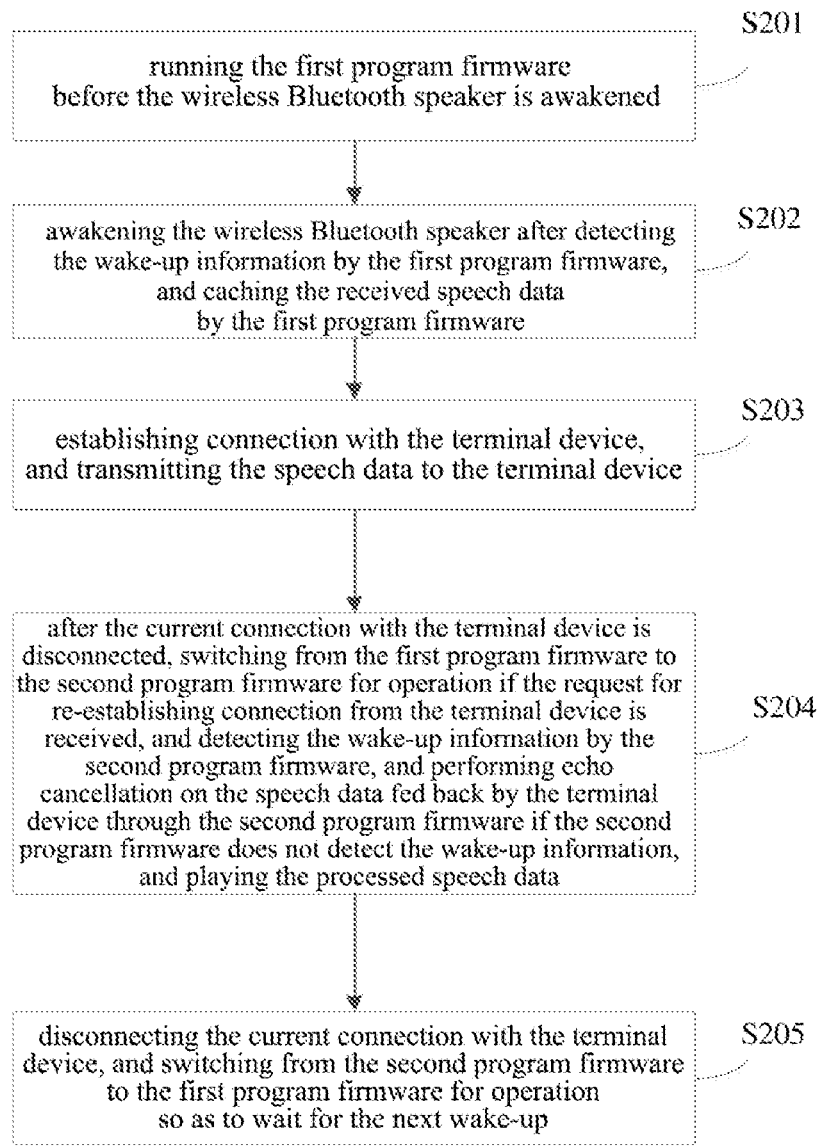
FIG. 2 is a schematic flowchart of the method for processing data of a wireless Bluetooth speaker provided by the second embodiment of the present application.

In the following description, specific details such as a specific system structure and a specific technology are presented for the purpose of illustration rather than limitation, such that embodiments of the present application can be understood thoroughly. However, it should be understood for those skilled in the art that the present application may also be implemented in other embodiments without these specific details. In other instances, detailed descriptions of well-known systems, devices, circuits and methods are omitted to avoid unnecessary details interfering with the description of the present application.

It should be understood that, the term "comprising", when used in the present description and the appended claims, indicates the existence of a feature, an entity, a step, an operation, an element and/or a component, but does not exclude the existence or addition of one or more other feature, entity, step, operation, element, component and/or combination thereof.

It should also be understood that, the terms used in the description of the present application is for the purpose of illustrating particular embodiment but not limiting the present application. As used in the description and the appended claims of the present application, the singular form "single", "one" and "said" are intended to include plural form, unless otherwise clearly specified by the context.

It should be further understood that, the term "and/or" used in the description and the appended claims of the present application means any combination and all possible combinations of one or more of items listed in association.

As used in the description and the appended claims, the term "if" can be interpreted as "when" or "once" or "in response to determining", or "in response to detecting" depending on the context. Similarly, the phrase "if is determined" or "if [condition or event described] is detected" may be interpreted to mean "once is determined" or "in response to determining" or "once [condition or event described] is detected, or "in response to detecting [condition or event described]" depending on the context.

It should be understood that, the size of the serial number of each step in the embodiments does not mean the order of execution, and the order of execution of each step should be determined by its function and internal logic, and should not be construed as limitation to the implementation process of the embodiments of the present application.

In order to illustrate the technical solutions described in the present application, the following description will be made by way of specific embodiments.

First Embodiment

FIG. 1-*a* is a schematic flowchart of the method for processing data of a wireless Bluetooth speaker provided by the first embodiment of the present application. The method may include the following steps of:

S101: running a first program firmware before the wireless Bluetooth speaker is awakened.

Where, the wireless Bluetooth speaker includes the first program firmware and a second program firmware. The first program firmware includes: a wake-up word detection firmware and a cache firmware; the second program firmware includes the wake-up word detection firmware and an echo cancellation firmware. It should be understood that, the wake-up word detection firmware in the first program firmware and the wake-up word detection firmware in the second program firmware are same one firmware, and when the first program firmware is switched to the second program firmware for operation, only the wake-up word detection firmware in the first program firmware is required to be reloaded while the echo cancellation firmware is loaded.

It should also be understood that, before the terminal device receives response data fed back by a server, no data is transmitted in the reverse link, and the speaker does not play any speech. At this time, the echo cancellation firmware is not required, thus only the wake-up word detection firmware and cache firmware need to be run in the forward link (as shown in FIG. 1-*b*), which saves the storage space of the system occupied by the echo cancellation firmware, and can accordingly increase the size of the storage space of the system occupied by the cache firmware when the size of the storage space of the system occupied by the wake-up word detection firmware is fixed, thereby the purpose of caching more speech data is achieved. Similarly, in the reverse link, since only the response data is transmitted and no speech data of the user is transmitted at this moment, thus there is no requirement of the cache firmware, and only the above-mentioned wake-up word detection firmware and the echo cancellation firmware (as shown in FIG. 1-*c*) need to be run, which can reduce the usage rate of the cache firmware in the reverse link while increasing the usage rate of the cache firmware in the forward link, thereby further increasing the size of the storage space of the system occupied by the cache firmware.

S102: awakening the wireless Bluetooth speaker after detecting wake-up information by the first program firmware, and caching received speech data by the first program firmware.

Where, the wake-up information includes at least one of: a preset wake-up keyword, a preset wake-up command, and a preset button being triggered.

It should be understood that, the loss of the speech data occurred during the process of establishing connection with the terminal device may be prevented through caching the received speech data by the cache firmware in the first program firmware.

S103: establishing connection with the terminal device, and transmitting the speech data to the terminal device.

Optionally, the wireless Bluetooth speaker establishes synchronous directional connection with the terminal device, and transmits the speech data based on the connection.

S104: after the current connection with the terminal device is disconnected, switching from the first program firmware to the second program firmware for operation if the request for re-establishing connection from the terminal device is received, and receiving the speech data fed back by the terminal device through the second program firmware, and playing the speech data fed back by the terminal device.

Where, the speech data fed back by the terminal device is response data corresponding to the speech data transmitted by the wireless Bluetooth speaker to the terminal device.

It should be noted that, after receiving the speech data transmitted by the wireless Bluetooth speaker, the terminal device will transmit the speech data to the server, and the server implements determination before a pre-analysis. If the server determines that the response data may be acquired through the current received speech data, then a stop recording instruction is transmitted to the terminal device, and then the terminal device disconnects from the wireless Bluetooth speaker and waits for receiving the response data fed back by the server after receiving the stop recording instruction.

It should be understood that, after disconnecting the current connection from the wireless Bluetooth speaker, the terminal device will transmit the request for re-establishing connection to the wireless Bluetooth speaker if receiving the response data fed back by the server, so as to re-establish connection to transmit the response data fed back by the server.

In the embodiment of the present application, the first program firmware is run before the wireless Bluetooth speaker is awakened. After detecting the wake-up information by the first program firmware, the wireless Bluetooth speaker is awakened, and the received speech data is cached through the first program firmware. Then, the connection with the terminal device is established, and the speech data is transmitted to the terminal device. After the current connection with the terminal device is disconnected, the first program firmware is switched to the second program firmware for operation if the request for re-establishing connection from the terminal device is connected, and the speech data fed back by the terminal device is received through the second program firmware, and then the speech data fed back by the terminal device is played. According to the embodiment of the present application, the running program firmware can be flexibly adjusted according to the state of the wireless Bluetooth speaker, thereby reducing the size of the storage space of the system occupied by other program firmware, and achieving the purpose of caching large amount of speech data with limited storage space in the system, which has relatively strong easy to use and practicability.

Second Embodiment

FIG. 2 is a schematic flowchart of the method for processing data of a wireless Bluetooth speaker provided by the second embodiment of the present application, which is a further refinement and description of the step S104 in the first embodiment, and the method may include the following steps of:

S201: running the first program firmware before the wireless Bluetooth speaker is awakened.

S202: awakening the wireless Bluetooth speaker after detecting the wake-up information by the first program firmware, and caching the received speech data by the first program firmware.

S203: establishing connection with the terminal device, and transmitting the speech data to the terminal device.

Where, the above steps S201-S203 are the same as the steps S101-S103 in the first embodiment, which are not described herein again.

S204: after the current connection with the terminal device is disconnected, switching from the first program firmware to the second program firmware for operation if the request for re-establishing connection from the terminal device is received, and detecting the wake-up information by the second program firmware, and performing echo cancellation on the speech data fed back by the terminal device through the second program firmware if the second program firmware does not detect the wake-up information, and playing the processed speech data.

It should be understood that, in the embodiment of the present application, the speech data fed back by the terminal device is performed echo cancellation through the echo cancellation firmware in the second program firmware, which may eliminate the echo generated during playing the speech data fed back by the terminal device in advance, thereby facilitating the detection of the preset wake-up keyword again during continuous wake-up process.

S205: disconnecting the current connection with the terminal device, and switching from the second program firmware to the first program firmware for operation so as to wait for the next wake-up.

It should be noted that, if the user does not awaken the wireless Bluetooth speaker again during the process of running the second program firmware, the terminal device will disconnect the current connection after feeding back the response data corresponding to the speech data transmitted by the wireless Bluetooth speaker to the terminal device, and the wireless Bluetooth speaker will switch back to the first program firmware after the connection with the terminal device is disconnected, and then wait for the user to awaken again.

In the embodiment of the present application, the first program firmware is run before the wireless Bluetooth speaker is awakened, and the wireless Bluetooth speaker is awakened after the wake-up information is detected by the first program firmware, and the received speech data is cached by the first program firmware. Then, the connection with the terminal device is established, and the speech data is transmitted to the terminal device. After the current connection with the terminal device is disconnected, the first program firmware is switched to the second program firmware if the request for re-establishing the connection from the terminal device is received. Further, the wake-up information is detected by the second program firmware, and the speech data fed back from the terminal device is processed through the second program firmware if the second program firmware does not detect the wake-up information, and the processed speech data is played, and then the current connection with the terminal device is disconnected, and the second program firmware is switched to the first program firmware to wait for the next wake-up. Through the embodiment of the present application, the second program firmware can be switched to the first program firmware in time after the current connection with the terminal device is disconnected, which speeds up the response speed of the wireless Bluetooth speaker, and facilitates caching more speech data, thereby having relatively strong ease of use and practicality.

Third Embodiment

Figure 3:
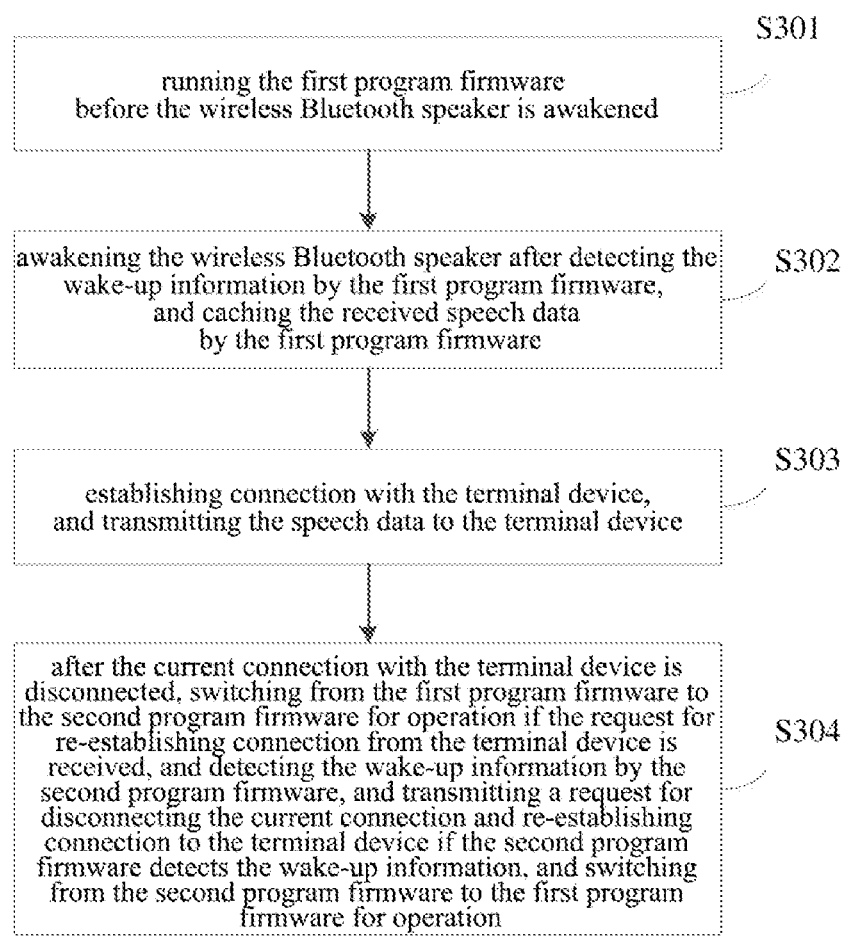
FIG. 3 is a schematic flowchart of the method for processing data of a wireless Bluetooth speaker provided by the third embodiment of the present application.

FIG. 3 is a schematic flowchart of the method for processing data of a wireless Bluetooth speaker provided by the third embodiment of the present application, which is another refinement and description of the step S104 in the first embodiment, and the method may include the following steps of:

S301: running the first program firmware before the wireless Bluetooth speaker is awakened.

S302: awakening the wireless Bluetooth speaker after detecting the wake-up information by the first program firmware, and caching the received speech data by the first program firmware.

S303: establishing connection with the terminal device, and transmitting the speech data to the terminal device.

Where, the above steps S301-S303 are the same as the steps S101-S103 in the first embodiment, which are not described herein again.

S304: after the current connection with the terminal device is disconnected, switching from the first program firmware to the second program firmware for operation if the request for re-establishing connection from the terminal device is received, and detecting the wake-up information by the second program firmware, and transmitting a request for disconnecting the current connection and re-establishing connection to the terminal device if the second program firmware detects the wake-up information, and switching from the second program firmware to the first program firmware for operation.

It should be understood that, if the second program firmware has detected the wake-up information, then it is indicated that the second wake-up has started, and it is necessary to cache new speech data again through the first program firmware. At this time, the wireless Bluetooth speaker will transmit the request for disconnecting the current connection and re-establishing connection to the terminal device, and switch from the second program firmware to the first program firmware for operation.

In the embodiment of the present application, the first program firmware is run before the wireless Bluetooth speaker is awakened, and the wireless Bluetooth speaker is awakened after the wake-up information is detected by the first program firmware, and the received speech data is cached by the first program firmware. Then, the connection with the terminal device is established, and the speech data is transmitted to the terminal device. After the current connection with the terminal device is disconnected, the first program firmware is switched to the second program firmware for operation if the request for re-establishing connection from the terminal device is received. Further, the wake-up information is detected by the second program firmware, and the request for disconnecting the current connection and re-establishing connection is transmitted to the terminal device if the second program firmware detects the wake-up information, and then the second program firmware is switched to the first program firmware for operation. According to the embodiment of the application, the second program firmware can be switched to the first program firmware in time when the wake-up information is detected, which reduces the running time of the second program firmware, and further reduces the size of the storage space of the system occupied by the echo cancellation firmware in the second program firmware, thereby having relatively strong ease of use and practicability.

Fourth Embodiment

Figure 4:
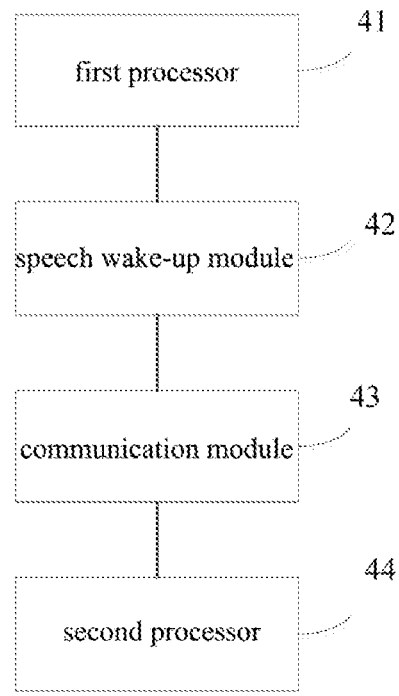
FIG. 4 is a structural schematic flowchart of the processor device for processing data of a wireless Bluetooth speaker provided by the fourth embodiment of the present application.

FIG. 4 is a structural schematic diagram of the processor device for processing data of a wireless Bluetooth speaker provided by the fourth embodiment of the present application. For convenience of description, only parts related to the embodiment of the present application are shown.

The device for processing data of a wireless Bluetooth speaker may be a hardware unit or a combination of the software unit and the hardware unit arranged inside the wireless Bluetooth speaker, or may be integrated into the wireless Bluetooth speaker as a separate pendant.

The device for processing data of a wireless Bluetooth speaker includes:

a first processor 41, configured to run a first program firmware before the wireless Bluetooth speaker is awakened;

a speech wake-up module 42, configured to awaken the wireless Bluetooth speaker after detecting wake-up information by the first program firmware, and to cache received speech data by the first program firmware;

a communication module 43, configured to establish connection with the terminal device, and to transmit the speech data to the terminal device; and a second processor 44, configured to switch from the first program firmware to the second program firmware for operation if the request for re-establishing connection from the terminal device is received after the current connection with the terminal device is disconnected, and to receive the speech data fed back by the terminal device through the second program firmware, and to play the speech data fed back by the terminal device, where, the speech data fed back by the terminal device is response data corresponding to the speech data transmitted by the wireless Bluetooth speaker to the terminal device.

Optionally, the second processor specifically includes:

a first subprocessor, configured to switch from the first program firmware to the second program firmware for operation if the request for re-establishing connection from the terminal device is received after the current connection with the terminal device is disconnected, and to detect the wake-up information by the second program firmware, and to perform echo cancellation on the speech data fed back by the terminal device through the second program firmware if the second program firmware does not detect the wake-up information, and to play the processed speech data.

a second subprocessor, configured to switch from the first program firmware to the second program firmware for operation if the request for re-establishing connection from the terminal device is received after the current connection with the terminal device is disconnected, and to detect the wake-up information by the second program firmware, and to transmit a request for disconnecting the current connection and re-establishing connection to the terminal device if the second program firmware detects the wake-up information, and to switch from the second program firmware to the first program firmware for operation.

Optionally, the processor device further includes:

a third processor, to disconnect the current connection with the terminal device, and to switch from the second program firmware to the first program firmware for operation so as to wait for the next wake-up.

Fifth Embodiment

Figure 5:
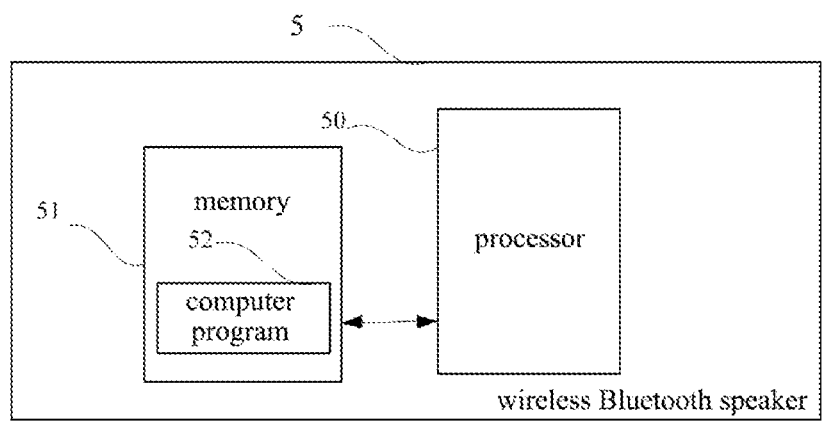
FIG. 5 is a structural schematic diagram of the wireless Bluetooth speaker provided by the fifth embodiment of the present application.

FIG. 5 is a structural schematic diagram of the wireless Bluetooth speaker provided by the fourth embodiment of the present application. As shown in FIG. 5, the wireless Bluetooth speaker 5 of this embodiment includes a processor 50, a memory 51, and a computer program 52 stored in the memory 51 and executable by the processor 50. The processor 50, when executing the computer program 52, implements the steps of the first embodiment, for example, the steps from S101 to S104 as shown in FIG. 1; or, implements the steps of the second embodiment, for example, the steps from S201 to S205 as shown in FIG. 2; or, implements the steps of the third embodiment, for example, the steps from S301 to S304 as shown in FIG. 3. The processor 50, when executing the computer program 52, implements the functions of the various modules/units in the embodiments concerning devices described above, such as the functions of the modules 41-44 as shown in FIG. 3.

Illustratively, the computer program 52 can be divided into one or more modules/units that are stored in the memory 51 and executed by the processor 50, so as to complete the present application. The one or more modules/units may be a series of computer program instruction segments capable of performing a particular function, and the instruction segments are used to describe the execution process of the computer program 52 in the wireless Bluetooth speaker 5.

The wireless Bluetooth speaker may include, but is not limited to, a processor 50 and a memory 51. It will be understood by those skilled in the art that FIG. 5 is only an example of the wireless Bluetooth speaker 5 and does not constitute a limitation of the wireless Bluetooth speaker 5, which may include more or less components than those illustrated, or combine some components or different components. For example, the wireless Bluetooth speaker may further include an input device/output device, a network access device, a bus, and the like.

The processor 50 may be a central processing unit (CPU), or may be another general-purpose processor, digital signal processor (DSP), application specific integrated circuit (ASIC), field-programmable gate array (FPGA), or other programmable logic device, discrete gate or transistor logic device, discrete hardware component, etc. The general-purpose processor may be a microprocessor, or the processor may be any conventional processor or the like.

The memory 51 may be an internal storage unit of the wireless Bluetooth speaker 5, such as a hard disk or an internal storage of the wireless Bluetooth speaker 5. The memory 51 may also be an external storage device of the wireless Bluetooth speaker 5, for example, a plug-in hard disk, a smart memory card (SMC), a secure digital (SD) card, and a flash card etc. provided on the wireless Bluetooth speaker 5. Further, the memory 51 may also include both an internal storage unit and an external storage device of the wireless Bluetooth speaker 5. The memory 51 is used to store the computer program and other programs and data required by the wireless Bluetooth speaker. The memory 51 may also be used to temporarily store data that has been output or is about to be output.

It will be clearly understood by a person skilled in the art that, for the convenience and brevity of the description, the specific operating process of the system, the processor device and the unit described above may refer to the corresponding process of the embodiments concerning the foregoing method, and details of which are not described herein again.

In the above embodiments, each of the embodiments is described with particular emphasis, and the part that is not detailed or described in certain embodiment may be referred to related description of other embodiments.

Those of ordinary skill in the art will appreciate that, the modules, the units, and/or the steps of the method of each embodiment described in combination with the embodiments disclosed herein can be implemented by electronic hardware, or a combination of computer software and electronic hardware. It will depend on the specific application and design constraints of the technical solutions whether these functions are performed in the form of hardware or software. A person skilled in the art can use different methods to implement the described functions for each particular application, but such implementation should not be considered to be beyond the scope of the present application.

In the several embodiments provided by the present application, it should be understood that, the disclosed system, device and method may be implemented in other manners. For example, the embodiments concerning the processor device described above are merely illustrative. For example, the division of the units is only a division of logical functions, and there may be another division manner during actual implementation. For example, a plurality of units or components may be combined or may be integrated into another system, or some features may be ignored or not executed. In addition, the mutual coupling or direct coupling or communication connection as shown or discussed may be an indirect coupling or communication connection through some interfaces, devices or units, and may be electrically connected, mechanically connected or other forms.

The units described as separate components may or may not be physically separated, and the components displayed as units may or may not be physical units, that is, it may be located at one place, or may be distributed to a plurality of network units. Some or all of the units may be selected according to actual needs to achieve the purpose of the solutions of the embodiments.

In addition, each of the functional units in each embodiment of the present application may be integrated into one processing unit, or each of the units may exist physically separately, or two or more units may be integrated into one unit. The above integrated unit can be implemented in the form of hardware or in the form of a software functional unit.

The integrated unit, if implemented in the form of the software functional unit and sold or used as a standalone product, may be stored in a computer readable storage medium. Based on such understanding, in the present application, that implement all or part of the processes in the foregoing embodiments concerning method may also be completed through instructing related hardware by the computer program. The computer program may be stored in the computer readable storage medium, and the computer program, when executed by the processor, may implements the steps of each of the embodiments of the method described above. Where, the computer program includes computer program code, which may be in the form of source code, object code, executable file or some intermediate forms. The computer readable medium may include any entity or device, recording medium, USB flash disk, mobile hard disk drive, magnetic disk, optical disk, computer memory, read-only memory (ROM), random access memory (RAM), electrical carrier signal, telecommunication signal or software distribution media etc. capable of carrying the computer program code. It should be noted that, the content contained in the computer readable medium may be appropriately added or removed according to the requirements of legislation and patent practice in a jurisdiction, for example, in some jurisdictions, the computer readable medium does not include electrical carrier data and telecommunication data according to the legislation and patent practice.

In the above description, the above embodiments are only used to illustrate the technical solutions of the present application, and are not intended to be limiting. Although the present application has been described in detail with reference to the foregoing embodiments, those of ordinary skill in the art will understand that: the technical solutions described in the above embodiments may still be modified, or a part of the technical features in the embodiments may be substituted by equivalents. These modifications and substitutions will not depart the nature of corresponding technical solutions from the spirit and scope of the technical solutions of the various embodiments of the present application.

What is claimed is:

1. A method for processing data of a wireless speaker, wherein the wireless speaker comprises a first program firmware and a second program firmware, and the method comprises:
   running the first program firmware before the wireless speaker is awakened;
   the wireless speaker after wake-up information is detected by the first program firmware, and caching received speech data by the first program firmware;
   establishing connection with a terminal device, and transmitting the speech data to the terminal device; and
   switching from the first program firmware to the second program firmware for operation if a request for re-establishing connection from the terminal device is received after a current connection with the terminal device is disconnected, and receiving speech data fed back by the terminal device through the second program firmware, and playing the speech data fed back by the terminal device, wherein the speech data fed back by the terminal device is response data corresponding to the speech data transmitted by the wireless speaker to the terminal device.

2. The method according to claim 1, wherein, after running the second program firmware, the method further comprises:
   detecting wake-up information through the second program firmware.

3. The method according to claim 2, wherein, the playing the speech data fed back by the terminal device comprises:
   performing echo cancellation on the speech data fed back by the terminal device through the second program firmware if the second program firmware does not detect the wake-up information, and playing the processed speech data.

4. The method according to claim 2, wherein, the detecting wake-up information through the second program firmware comprises:
   transmitting a request for disconnecting the current connection and re-establishing connection to the terminal device if the second program firmware detects the wake-up information, and switching from the second program firmware to the first program firmware for operation.

5. The method according to claim 1, wherein, after the playing the speech data fed back by the terminal device, the method comprises:
   disconnecting the current connection with the terminal device, and switching from the second program firmware to the first program firmware for operation, so as to wait for next wake-up.

6. The method according to claim 2, wherein, after the playing the speech data fed back by the terminal device, the method comprises: disconnecting the current connection with the terminal device, and switching from the second program firmware to the first program firmware for operation, so as to wait for next wake-up.

7. The method according to claim 3, wherein, after the playing the speech data fed back by the terminal device, the method comprises: disconnecting the current connection with the terminal device, and switching from the second program firmware to the first program firmware for operation, so as to wait for next wake-up.

8. The method according to claim 4, wherein, after the playing the speech data fed back by the terminal device, the method comprises: disconnecting the current connection with the terminal device, and switching from the second program firmware to the first program firmware for operation, so as to wait for next wake-up.

9. The method according to claim 1, wherein, the first program firmware comprises a wake-up word detection firmware and a cache firmware, and the second program firmware comprises a wake-up word detection firmware and an echo cancellation firmware, wherein the wake-up word detection firmware in the first program firmware and the wake-up word detection firmware in the second program firmware are same one firmware.

10. The method according to claim 9, wherein, when the first program firmware is switched to the second program firmware for operation, only the wake-up word detection firmware in the first program firmware is required to be reloaded while the echo cancellation firmware is loaded.

11. The method according to claim 1, wherein, the wake-up information comprises at least one of: a preset wake-up keyword, a preset wake-up command, and a preset button being triggered.

12. The method according to claim 1, wherein, after the transmitting the speech data to the terminal device, the method further comprises: transmitting the speech data to a server by the terminal device, and determining, by the server, whether the current received speech data is able to acquire the response data.

13. A processor device for processing data of a wireless speaker, wherein, the wireless speaker comprises a first program firmware and a second program firmware, and the device comprises:
   a first processing hardware module, configured to run the first program firmware before the wireless speaker is awakened;
   a wake-up hardware module, configured to awaken the wireless speaker after detecting wake-up information by the first program firmware, and to cache received speech data by the first program firmware;
   a communication hardware module, configured to establish connection with a terminal device, and to transmit the speech data to the terminal device; and
   a second processing hardware module, configured to switch from the first program firmware to the second program firmware for operation if a request for re-establishing connection from the terminal device is received after current connection with the terminal device is disconnected, and to receive speech data fed back by the terminal device through the second program firmware, and to play the speech data fed back by the terminal device, wherein the speech data fed back by the terminal device is response data corresponding to the speech data transmitted by the wireless speaker to the terminal device.

14. The processor device according to claim 13, wherein, the second processing hardware module specifically comprises:
- a first hardware processing unit, configured to switch from the first program firmware to the second program firmware for operation if the request for re-establishing connection from the terminal device is received after the current connection with the terminal device is disconnected, and to detect wake-up information by the second program firmware, and to perform echo cancellation on the speech data fed back by the terminal device through the second program firmware if the second program firmware does not detect the wake-up information, and to play the processed speech data; and
- a second hardware processing unit, configured to switch from the first program firmware to the second program firmware for operation if the request for re-establishing connection from the terminal device is received after the current connection with the terminal device is disconnected, and to detect the wake-up information by the second program firmware, and to transmit a request for disconnecting the current connection and re-establishing connection to the terminal device if the second program firmware detects the wake-up information, and to switch from the second program firmware to the first program firmware for operation.

15. The processor device according to claim 13, wherein, the device further comprises:
- a third processing hardware module, configured to disconnect current connection with the terminal device, and to switch from the second program firmware to the first program firmware for operation, to wait for next wake-up.

16. A wireless speaker, comprising a memory, a processor, and computer program stored in the memory and executable by the processor, wherein, the processor, when executing the computer program, to:
- run the first program firmware before the wireless speaker is awakened;
- awaken the wireless speaker after wake-up information is detected by the first program firmware, and caching received speech data by the first program firmware;
- establish connection with a terminal device, and transmitting the speech data to the terminal device; and
- switch from the first program firmware to the second program firmware for operation if a request for re-establishing connection from the terminal device is received after a current connection with the terminal device is disconnected, and receiving speech data fed back by the terminal device through the second program firmware, and playing the speech data fed back by the terminal device, wherein the speech data fed back by the terminal device is response data corresponding to the speech data transmitted by the wireless speaker to the terminal device.

17. The wireless speaker according to claim 16, wherein, after running the second program firmware, the processor, when executing the computer program, to:
- detect wake-up information through the second program firmware.

18. The wireless speaker according to claim 17, wherein, the playing the speech data fed back by the terminal device comprises:
- performing echo cancellation on the speech data fed back by the terminal device through the second program firmware if the second program firmware does not detect the wake-up information, and playing the processed speech data.

19. The wireless speaker according to claim 17, wherein, the detecting wake-up information through the second program firmware comprises:
- transmitting a request for disconnecting the current connection and re-establishing connection to the terminal device if the second program firmware detects the wake-up information, and switching from the second program firmware to the first program firmware for operation.

20. The wireless speaker according to claim 16, wherein, after the playing the speech data fed back by the terminal device, the processor, when executing the computer program, to:
- disconnect the current connection with the terminal device, and switching from the second program firmware to the first program firmware for operation, so as to wait for next wake-up.

* * * * *